United States Patent
Barkley et al.

(10) Patent No.: US 7,336,654 B2
(45) Date of Patent: Feb. 26, 2008

(54) PORTABLE VOIP SERVICE ACCESS MODULE

(75) Inventors: Robb Barkley, Marietta, GA (US); Mark Baker, Alpharetta, GA (US); Douglas F. Bender, Scotts Valley, CA (US)

(73) Assignee: I2Telecom International, Inc., Roswell, GA (US)

( * ) Notice: Subject to any disclaimer, the term of this patent is extended or adjusted under 35 U.S.C. 154(b) by 505 days.

(21) Appl. No.: 10/972,726

(22) Filed: Oct. 25, 2004

(65) Prior Publication Data

US 2006/0088025 A1 Apr. 27, 2006

Related U.S. Application Data

(63) Continuation-in-part of application No. 10/969,516, filed on Oct. 20, 2004, now abandoned.

(51) Int. Cl.
*H04L 12/66* (2006.01)
*H04L 12/56* (2006.01)
*H04L 12/28* (2006.01)

(52) U.S. Cl. ............ 370/352; 370/382; 370/383; 235/380; 726/20; 709/235

(58) Field of Classification Search ........ 370/352–359, 370/401–402, 382–383; 726/7, 9, 12, 16–17, 726/21, 20; 235/380; 709/235
See application file for complete search history.

(56) References Cited

U.S. PATENT DOCUMENTS 5,402,481 A 3/1995 Waldman
5,809,128 A 9/1998 McMullin
5,987,103 A 11/1999 Martino
6,091,732 A 7/2000 Alexander, Jr. et al.
6,118,768 A 9/2000 Bhatia et al.
6,125,113 A 9/2000 Farris et al.
6,185,288 B1 2/2001 Wong
6,256,778 B1 7/2001 Oliver
6,359,880 B1 3/2002 Curry et al.

(Continued)

OTHER PUBLICATIONS

Rosenberg, J. et al. "STUN—Simple Traversal of User Datagram Protocol (UDP) Through Network Address Translators (NATs)," RFC 3489, Mar. 2003, pp. 1-47.

(Continued)

*Primary Examiner*—Binh K. Tieu
(74) *Attorney, Agent, or Firm*—Toler Schaffer, LLP

(57) ABSTRACT

A voice over IP (VoIP) softphone access module (VSAM) comprises a softphone client installed on a portable memory device (PMD). The softphone client is installed in its own read-only partition. The softphone client is adapted to auto-run from the PMD when the PMD is connected to a computing device and to load an instance of the softphone client in the volatile memory of the computing device. When used with a computing device comprising a duplex audio system with analog-to-digital conversion and an Internet connection, the VSAM permits a VoIP service subscriber to send and receive VoIP telephone calls through a VoIP service provider gateway. The VSAM may be associated with an activation code that when sent to the VoIP service provider gateway associates a user with pre-paid softphone usage credits. Alternatively, the softphone client is installed on CD.

30 Claims, 5 Drawing Sheets

U.S. PATENT DOCUMENTS

| | | |
|---|---|---|
| 6,445,694 B1 | 9/2002 | Swartz |
| 6,449,251 B1 | 9/2002 | Awadallah et al. |
| 6,542,497 B1 | 4/2003 | Curry et al. |
| 6,597,686 B1 | 7/2003 | Smyk |
| 6,618,761 B2 | 9/2003 | Munger et al. |
| 6,636,504 B1 | 10/2003 | Albers et al. |
| 6,658,496 B1 * | 12/2003 | Minakata et al. ............... 710/5 |
| 6,700,956 B2 | 3/2004 | Chang et al. |
| 6,760,324 B1 | 7/2004 | Scott et al. |
| 6,763,226 B1 | 7/2004 | McZeal, Jr. |
| 6,788,769 B1 | 9/2004 | Waites |
| 6,795,540 B1 * | 9/2004 | Mow ........................... 379/188 |
| 6,895,000 B2 | 5/2005 | Lai et al. |
| 6,947,417 B2 | 9/2005 | Laursen et al. |
| 6,954,454 B1 | 10/2005 | Schuster et al. |
| 7,012,888 B2 | 3/2006 | Schoeneberger et al. |
| 7,016,481 B2 | 3/2006 | McElvaney |
| 7,145,900 B2 | 12/2006 | Nix et al. |
| 7,213,766 B2 * | 5/2007 | Ryan et al. .................. 235/492 |
| 2001/0038033 A1 | 11/2001 | Habib |
| 2002/0052965 A1 | 5/2002 | Dowling |
| 2002/0097843 A1 | 7/2002 | Krol et al. |
| 2002/0131604 A1 | 9/2002 | Aminc |
| 2002/0147912 A1 | 10/2002 | Shmueli et al. |
| 2002/0184376 A1 | 12/2002 | Sternagle |
| 2002/0191621 A1 | 12/2002 | Jha |
| 2002/0191768 A1 | 12/2002 | Milton |
| 2003/0002479 A1 | 1/2003 | Vortman et al. |
| 2003/0023669 A1 | 1/2003 | DeLima et al. |
| 2003/0093606 A1 | 5/2003 | Mambakkam et al. |
| 2003/0110257 A1 | 6/2003 | Hyun et al. |
| 2003/0112820 A1 | 6/2003 | Beach |
| 2003/0123388 A1 | 7/2003 | Bradd |
| 2003/0161453 A1 | 8/2003 | Veschi |
| 2003/0204619 A1 | 10/2003 | Bays |
| 2003/0214939 A1 | 11/2003 | Eldumiati et al. |
| 2004/0019539 A1 | 1/2004 | Raman et al. |
| 2004/0032862 A1 | 2/2004 | Schoeneberger et al. |
| 2004/0047451 A1 | 3/2004 | Barker et al. |
| 2004/0086093 A1 | 5/2004 | Schranz |
| 2004/0114581 A1 * | 6/2004 | Hans et al. .................. 370/356 |
| 2004/0133668 A1 * | 7/2004 | Nicholas ..................... 709/223 |
| 2004/0141508 A1 | 7/2004 | Schoeneberger et al. |
| 2004/0141758 A1 | 7/2004 | El-Reedy |
| 2004/0165578 A1 | 8/2004 | Burritt et al. |
| 2004/0205023 A1 * | 10/2004 | Hafer et al. ................... 705/43 |
| 2004/0218583 A1 | 11/2004 | Adan et al. |
| 2004/0223458 A1 * | 11/2004 | Gentle ........................ 370/230 |
| 2004/0248590 A1 | 12/2004 | Chan et al. |
| 2004/0258003 A1 | 12/2004 | Kokot et al. |
| 2005/0074031 A1 * | 4/2005 | Sunstrum ..................... 370/493 |
| 2005/0074122 A1 * | 4/2005 | Fascenda ..................... 380/258 |
| 2005/0089052 A1 | 4/2005 | Chen et al. |
| 2005/0094621 A1 | 5/2005 | Acharya et al. |
| 2005/0138183 A1 | 6/2005 | O'Rourke et al. |
| 2005/0180464 A1 | 8/2005 | McConnell et al. |
| 2005/0195799 A1 | 9/2005 | Burne et al. |
| 2005/0220083 A1 | 10/2005 | Takeuchi |
| 2005/0243733 A1 * | 11/2005 | Crawford et al. ............ 370/252 |
| 2006/0008059 A1 * | 1/2006 | Ying et al. ................ 379/88.17 |
| 2006/0029062 A1 * | 2/2006 | Rao et al. .................... 370/389 |
| 2006/0029063 A1 * | 2/2006 | Rao et al. .................... 370/389 |
| 2006/0037071 A1 * | 2/2006 | Rao et al. ...................... 726/13 |
| 2006/0039356 A1 * | 2/2006 | Rao et al. .................... 370/352 |
| 2006/0208066 A1 * | 9/2006 | Finn et al. ................... 235/380 |
| 2006/0276230 A1 * | 12/2006 | McConnell .................. 455/563 |

OTHER PUBLICATIONS

Schulzrinne, H. "Dynamic Host Configuration Protocol (DHCP-for-IPv4) Option for Session Initiation Protocol (SIP) Servers," RFC 3361, Aug. 2002, pp. 1-7.

Camarillo, G. et al. "Integration of Resource Management and Session Initiation Protocol (SIP)," RFC 3312, Oct. 2002, pp. 1-30.

"EcoCarrier-carrier, long distance, call, VoIP, ITSP, service", www.ecocarrier.com, printed Jun. 13, 2005, pp. 1-3.

"EcoPhone (TM) + VoIP!Phone (TM) Q-FONE-USB", which appears to come from www.qiiq.com, Jun. 10, 2005, printed Jun. 10, 2005, pp. 1-3.

"Brief Introduction to QiiQ Communications Inc. and Eccocarrier Inc.", www.qiiq.com, printed Jun. 10, 2005 and Jul. 17, 2007, pp. 1-7.

Trembley, J. "VoIP makes real-time billing a necessity", Billing Plus, vol. 6, No. 17, Oct. 4, 2004, p. 13.

"Pre-paid Call Credits—Adding Extra Call Credits", www.2hands.com.au, (added to catalog Jun. 30, 2004), printed Jun. 1, 2005, pp. 1-2.

"SIPphoneCasting. Inspired by: Skype Podcast Recorder = SkypeCasters", linuxathome.com, Dec. 29, 2004, pp. 1-4.

"CommGenie VoIP Suite", www.nexge.com, copyright 2002, pp. 1-3.

"Web Based, VoIP Billing, VoIP Routing, and VoIP Management Software", www.webvoip.com, printed Jun. 1, 2005, pp. 1-2.

Tittel, E. "Cool Tools: USB Desktop Peripherals and Devices", www.certmag.com, Jun. 2005, pp. 1-7.

Bennet, B. "Memory in a Flash", www.theage.com.au, Jan. 31, 2004, pp. 1-3.

* cited by examiner

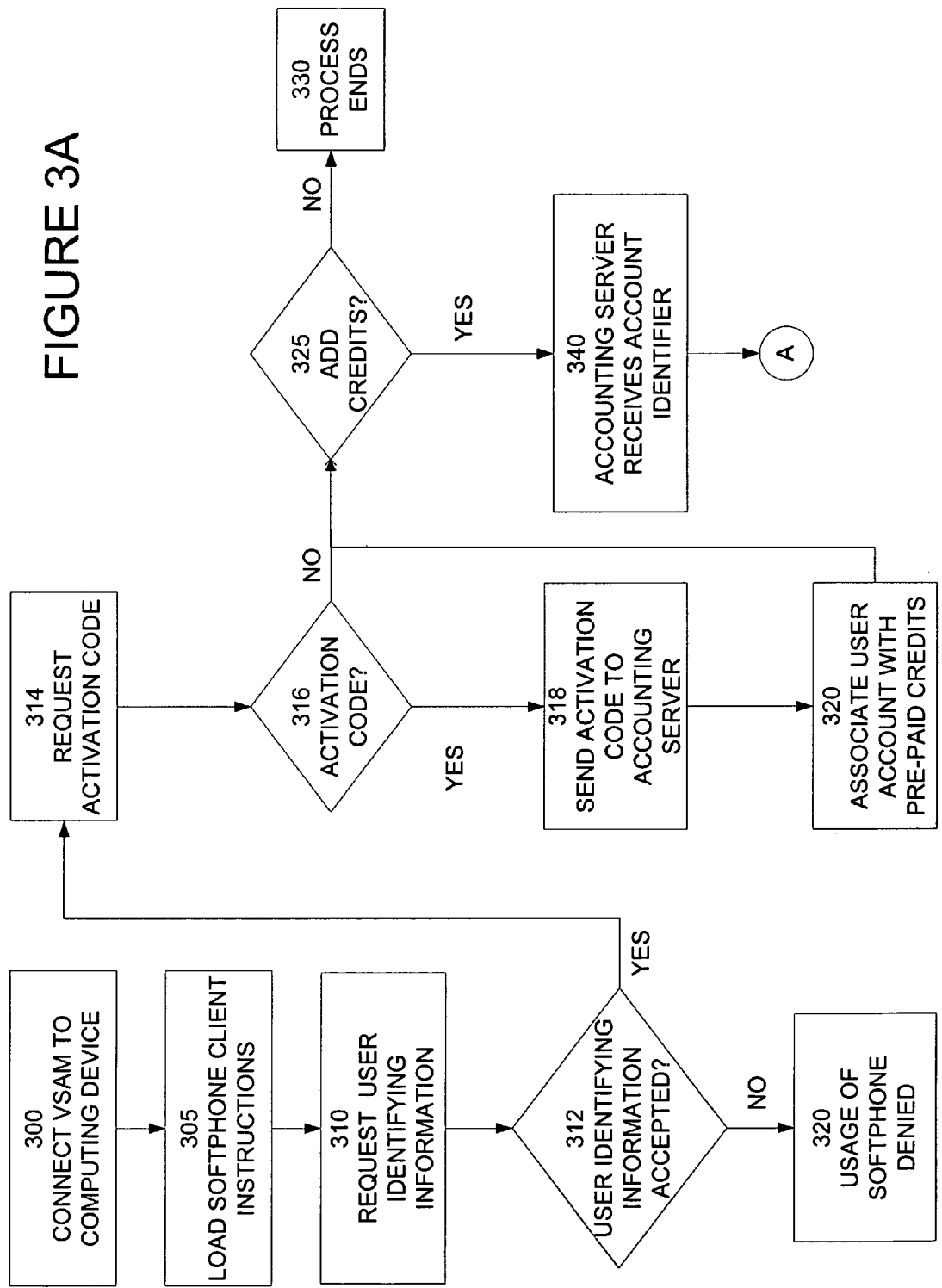

PORTABLE VOIP SERVICE ACCESS MODULE

RELATIONSHIP TO OTHER INVENTIONS

This application is a continuation in part of application Ser. No. 10/969,516 filed Oct. 20, 2004 now abandoned.

BACKGROUND

Embodiments of the present invention are generally directed to enabling digital telephony and more particularly to systems and methods for providing digital telephone services via a portable media.

Packet switched networks (PSNs), most notably the Internet, have become increasingly accessible on a worldwide scale. Digital telephony service offers the promise of relatively inexpensive and feature-rich telephone service to users of PSNs.

One form of digital telephony, voice over Internet protocol or "VoIP," has attracted significant market attention. A typical VoIP environment comprises a telephone that is connected to an analog-to-digital converter (ADC). The ADC converts analog voice signal from a plain old telephone (POT) phone and converts it into a compressed audio data stream. The ADC may be a standalone device that is connected to a computing device (e.g., a desktop computer, a laptop computer, or a personal digital assistant) or a component of a computing device (e.g., a sound card).

The computing device runs a software client (sometimes referred to as a "soft-phone client"). The softphone client presents the user a graphical interface that provides access to various telephone functions, for example, dialing, answering machine, call log, and number directory. The soft-phone client generates telephone-signaling information and converts the signaling information and compressed audio stream into packets. The soft-phone client may also use the sound card of the computer to provide two-way voice communication thereby dispensing with the need for the POT.

The softphone clients typically use the session initiation protocol (SIP) to establish call "sessions." The softphone client also comprises one more audio compression codecs. Having more codecs allows the audio compression scheme to optimally utilize the network bandwidth.

A telephone connection may be established directly between two parties in a peer-to-peer configuration or service configuration through a central processor comprising a softswitch and a proxy server. The peer-to-peer configuration requires the two parties to know their respective Internet protocol (IP) addresses. In the service configuration, a softswitch, usually operated for a fee by a third party, can associate a telephone number with an IP address, and provides routing and signaling tasks to emulate services provided by the public switched telephone network (PSTN).

When a VoIP service subscriber initiates a call, the caller's telephone goes "off-hook" and the subscriber dials a called telephone number. The softphone client and the softswitch establish a session. The called telephone number is sent to the softswitch. If the call is directed to another VoIP service subscriber, the telephone number is translated to an IP address of the called party. The proxy server attempts to establish a session with the called party's softphone. If successful, the calling party's softphone and the called party's softphone exchange voice data packets. The ADC at each end of the call translates the incoming digital audio stream into analog signals that can be received by a POT or the sound card of the computer. When the call is completed (the telephone goes "on-hook"), and the softphone client sends a signal to the softswitch terminating the session.

A VoIP service subscriber may have access to the Internet at multiple locations using a variety of computing devices. Additionally, the VoIP subscriber may not have authority to install software on the computing device. For example, a VoIP subscriber may be using a computer at a place of employment, at the residence of a friend, or at an "Internet café" where Internet access is provided as a convenience or as a service. Currently, VoIP service access in these and similar situations would require that the softphone be installed and configured on the foreign computing device and, presumably, removed when the subscriber departs. The subscriber thereby risks disrupting the operation of the foreign computing device and exposing the subscriber's confidential information to capture by the foreign computer.

A VoIP subscriber may also have multiple computing devices from which VoIP calls can be made. Currently, each computing device is required to have a softphone installed and configured. The multiple softphone implementations each must be maintained individually. For example, updates to the software client and to the subscriber's preference must be installed on each softphone client so that the softphone clients are current.

What would be useful is a portable digital telephone softphone access module that may be operated from a computing device without significant reconfiguration of the operating system of the computing device.

SUMMARY

In an embodiment of the present invention, a digital telephony softphone access module comprises a softphone client installed on a portable memory device (PMD). The softphone client is installed in its own read-only partition. The softphone client is adapted to autorun from the PMD when the PMD is connected to a computing device and to load an instance of the softphone client in the volatile memory of the computing device. Use of the VSAM is protected by a login process that is known in the art.

In an exemplary embodiment of the present invention, the digital telephony service is a VoIP service and the digital telephony softphone access module is a VoIP softphone access module (VSAM). When used with a computing device comprising a duplex audio system with analog-to-digital conversion and an Internet connection, the VSAM permits a VoIP service subscriber to send and receive VoIP telephone calls.

While embodiments of the present invention will be described in terms of a VoIP service, the present invention is not so limited. As will be appreciated by those skilled in the art, a softphone access module used in conjunction with other digital telephony services provided over a packet network are within the scope of the present invention.

In an embodiment of the present invention, the PMD further comprises read/write memory that is accessible to the computing device. In this embodiment, the read/write memory comprises a telephone directory file and user preference information file. When the softphone client is loaded, the VSAM locates the files and loads the directory and user preference information into the volatile memory of the computing device.

In an alternate embodiment of the present invention, softphone client resides on a CD. The softphone client is installed in a closed session. The softphone client is adapted to autorun from the CD ROM when the CD is inserted in an appropriate reader and to load an instance of the softphone client in the volatile memory of the computing device. In yet another embodiment of the present invention the softphone client resides on a mini-disk (MD).

It is therefore an aspect of the present invention to provide a VoIP service subscriber with a portable VSAM that may be operated from different computing devices.

It is another aspect of the present invention to load a softphone client from a portable VSAM into the volatile memory of a computing device when the VSAM is connected to the computing device.

It is still another aspect of the present invention to unload the softphone client if the portable VSAM is disconnected from the computing device.

It is another aspect of the present invention to account for usage of the softphone from a central location.

It is an aspect of the present invention to provide a VoIP subscriber a VSAM comprising pre-paid softphone usage credits.

It is still another aspect of the present invention to allow a subscriber using a VSAM with pre-paid softphone usage to add additional softphone usage credits to the VSAM.

It is yet another aspect of the present invention to permit a subscriber to add additional softphone usage credits to a VSAM from a home computer and a retailer computer.

It is another aspect of the present invention to permit a subscriber to add additional softphone usage credits to a VSAM from a telephone.

These and other aspects of the present invention will become apparent from a review of the general and detailed descriptions that follow.

In an embodiment of the present invention, a VSAM comprises a portable memory device and a softphone client. The portable memory device comprises a read-only memory partition and is adapted to operate when installed in a computing device comprising a duplex audio system. By way of illustration and not as a limitation, the computing device may be a desktop computer, a laptop computer and a personal data assistant.

The softphone client is stored in the read-only memory partition of the portable memory device and comprises instructions for auto-running the softphone client upon detection of the portable memory device by the computing device, and performing the functions of a plain old telephone.

In another embodiment of the present invention, the portable memory device further comprises read/write memory. In this embodiment, the computer instructions further comprise instructions for reading and writing a telephone directory file to the read/write memory, reading and writing a user preference file to the read/write memory, and recording a telephone conversation and saving the recording as a file in the read/write memory.

In yet another embodiment of the present invention, a VoIP provisioning system comprises a network, a VoIP service provider gateway connected to the network and comprising a user record, and a VSAM. The VSAM comprises a portable memory device. The portable memory device comprises a read-only memory partition and is adapted to operate when installed in a computing device comprising a duplex audio system. By way of illustration and not as a limitation, the computing device may be a desktop computer, a laptop computer and a personal data assistant. The portable memory device comprises a read-only memory partition, and wherein the portable memory device is adapted to operate when installed in a computing device comprising a duplex audio system.

The user record comprises softphone usages credits indicative of minutes of use of the softphone client. In one embodiment of the present invention, the softphone usage credits are pre-assigned to a purchaser of a VSAM. In another embodiment of the present invention, the softphone further comprises instructions for communicating with VoIP service provider gateway to add softphone usage credits to the user record.

A softphone client is stored in the read-only memory partition. The softphone client comprises instructions for auto-running the softphone client upon detection of the portable memory device by the computing device, performing the functions of a plain old telephone, and communicating with the VoIP service provider gateway to initiate and receive telephone calls over the network. In an embodiment of the present invention, the telephone call terminates with a VoIP service subscriber. In another embodiment of the present invention, the telephone call terminates with a public switched network subscriber.

In another embodiment of the present invention, the portable memory device further comprises read/write memory. In this embodiment, the computer instructions further comprise instructions for reading and writing a telephone directory file to the read/write memory, reading and writing a user preference file to the read/write memory, and recording a telephone conversation and saving the recording as a file in the read/write memory.

DESCRIPTION OF THE FIGURES

FIGS. 3A and 3B illustrate the flow of a process in which a VSAM acquires softphone usage credits according to embodiments of the present invention.

DETAILED DESCRIPTION

In an embodiment of the present invention, a VoIP softphone access module (VSAM) comprises a softphone client installed on a portable memory device (PMD). The softphone client is installed in its own read-only partition. The softphone client is adapted to autorun from the PMD when the PMD is connected to a computing device and to load an instance of the softphone client in the volatile memory of the computing device. When used with a computing device comprising a duplex audio system with analog-to-digital conversion and an Internet connection, the VSAM permits a VoIP service subscriber to send telephone calls to, and receive telephone calls from, VoIP clients and PSTN clients.

Figure 1:
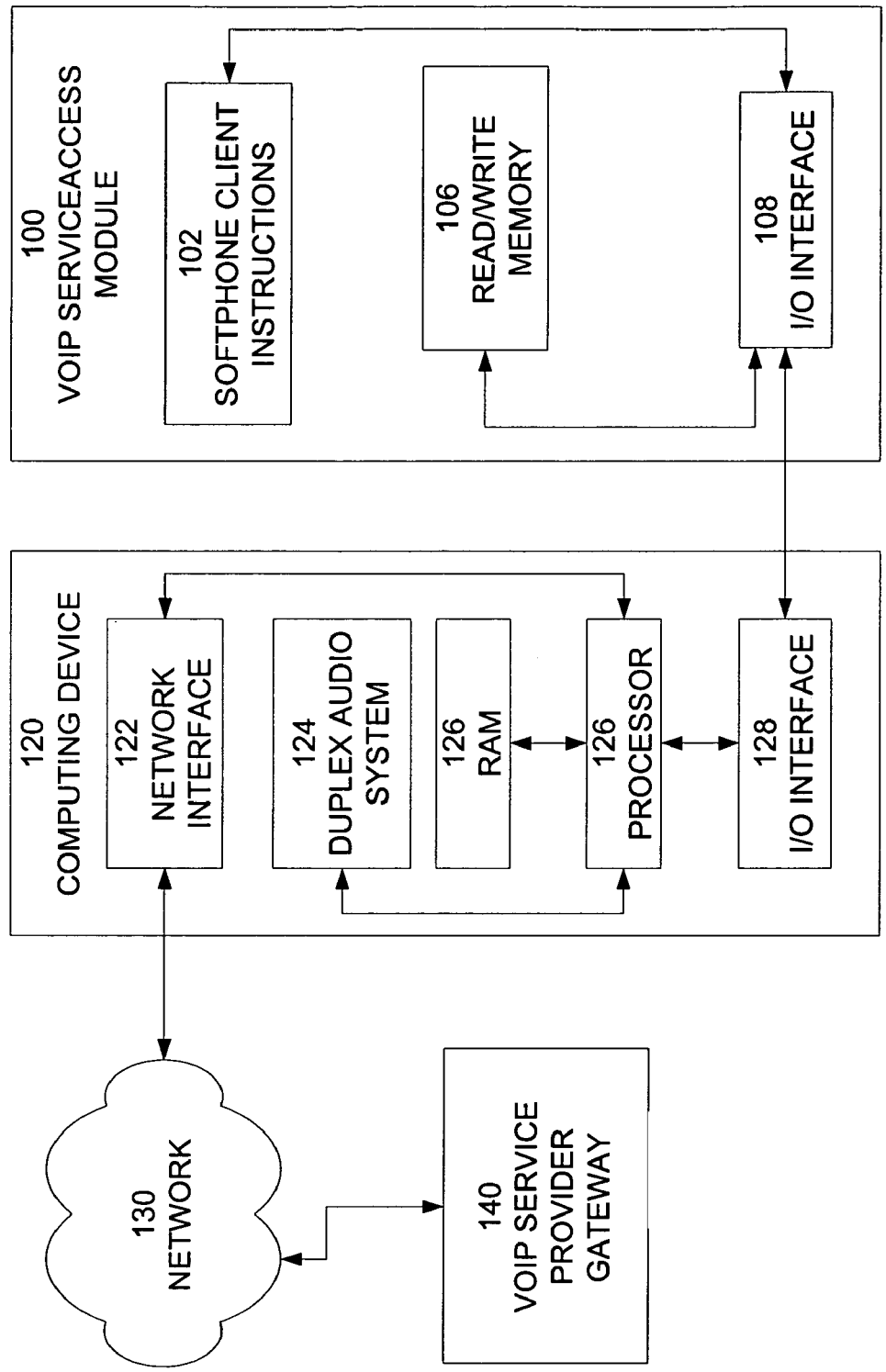
FIG. 1 illustrates a block diagram of the components of a VoIP service access module (VSAM) according to embodiments of the present invention.

FIG. 1 illustrates a block diagram of the components of a VSAM according to embodiments of the present invention. Referring to FIG. 1, VoIP service access module 100 connects to a computing device 120 via compatible I/O ports 108 and 128. In an embodiment of the present invention, computing device 120 is a desktop computer. However, as will be appreciated by those skilled in the art, this is not meant as a limitation. Other computing devices may be used without departing from the scope of the present invention.

By way of illustration, computing device 120 may be a laptop computer or a personal data assistant (PDA) having a duplex audio system.

In an embodiment of the present invention, I/O interfaces 108 and 128 are USB ports. As will be appreciated by those skilled in the art, other interfaces may be used to connect VSAM 100 and computing device 120 so long as the interfaces are compatible.

VoIP service access module 100 further comprises softphone client instructions 102. Softphone client instructions 102 comprise code executable by the operating system of computing device 120. The softphone client instructions 102 enable computing device 120 to perform the functions of a plain old telephone including dialing, sending voice information, and receiving voice communications.

In an embodiment of the present invention, softphone client instructions 102 reside in a read-only memory partition. The read-only memory is adapted to auto-run upon detection of the installation of VSAM 100. In an embodiment of the present invention, the read-only memory partition is identified by computing device 120 as a bootable device.

In yet another embodiment of the present invention, VSAM 100 further comprises read/write memory 106. In this embodiment, the read/write memory 106 comprises a telephone directory file and user preference information file. When the softphone client is loaded, the softphone client instructions 102 locate the files and loads the directory and user preference information into the volatile memory of the computing device. In yet another embodiment of the present invention, softphone client instructions 102 comprise a conversation recording/playback feature for recording a telephone conversation and storing the recording as a file in the read/write memory 106 for later playback by the user.

Computing device 120 further comprises processor 126, which controls communications over I/O interfaces 128 and 108, the loading of softphone client instructions 102 in random access memory 126, and the execution of those instructions. In an embodiment of the present invention, processor 126 detects the presence of VSAM 100 at I/O interface 128, loads softphone client instructions 102 into RAM 126, and executes those instructions.

When processor 126 detects the presence of VSAM 100 at I/O interface 128, the softphone client instructions prompts the user of VSAM 100 for identifying information. The identifying information is sent to VoIP service gateway 140 for authentication. If the user of VSAM 100 provides the correct identifying information, processor 126 then continues to loads softphone client instructions 102 as previously described. Additionally, the softphone client instructions 102 provide information to VoIP service provider gateway 140 that identifies the network location of the computing device 120 on which the softphone client instructions are located, thereby facilitating telephone calls to and from the VSAM 100. In still another embodiment of the present invention, processor 126 continues to monitor the presence of service access module 100. If service module 100 is removed, the softphone client instructions are unloaded from RAM 126.

Optionally, the user of VSAM 100 is further prompted for an activation code. A user without an activation code declines the prompt and the softphone client instructions 102 are loaded as previously described. A user with an activation code enters the activation code, and the code is reported to VoIP service gateway 140. The activation code is reported to an accounting server 200 (see FIG. 2) and is used to associate pre-paid softphone usage credits with the user of VSAM 100.

Computing device 120 further comprises network interface 122 that permits computing device 120 to send and receive VoIP packets to VoIP service provider gateway 140 via network 130. In an embodiment of the present invention, network 130 is the Internet, however this is not meant as a limitation. Network 130 may be any IP network through which computing device 120 may communicate with VoIP service provider gateway 140. By way of illustration, and not as a limitation, network 130 is a cable network. In this embodiment, network interface 122 connects to network 130 through a cable modem (not illustrated but known to those skilled in the art).

Network interface 122 may be a wired interface or a wireless interface. Where network interface 122 is a wireless interface, network 130 is a wireless network that can communicate with the network on which VoIP service provider gateway 140 is located.

Figure 2:
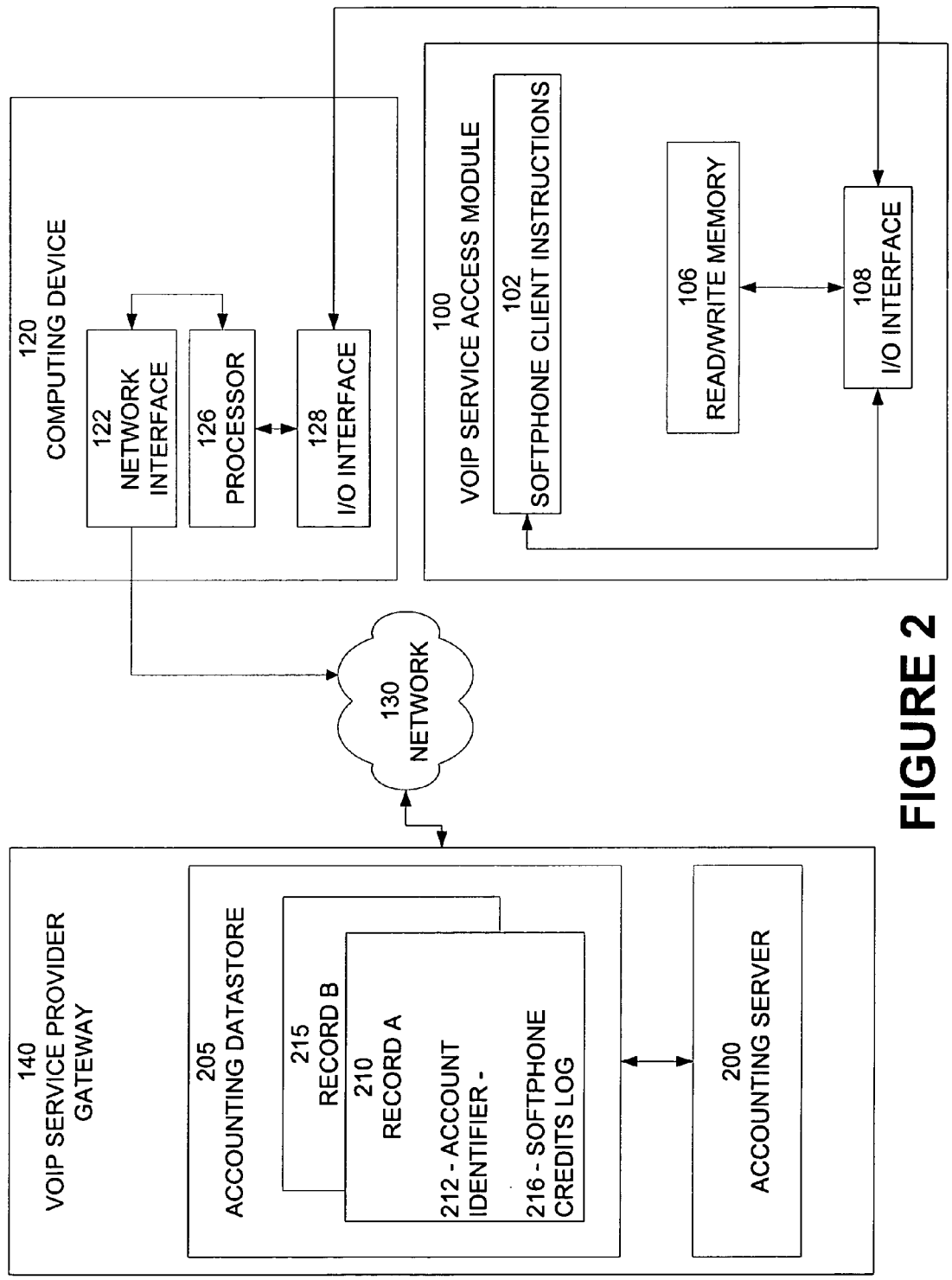
FIG. 2 illustrates a block diagram of a process for associating VoIP service access credits with a VSAM 100 according to embodiments of the present invention.

FIG. 2 illustrates a block diagram of a process for associating VoIP service access credits with a VSAM 100 according to embodiments of the present invention. Referring to FIG. 2, an accounting datastore 205 within service provider gateway 140 stores VoIP service credits associated with an account identifier. Accounting server 200 provides secured access to the accounting datastore 205 by computing device 120. Computing device 120 comprises network interface 122, processor 126 and I/O interface 128. Computing device 120 accesses accounting server 200 via network 130 through network interface 122. Computing device 120 also accesses the I/O interface 108 of VSAM 100 via I/O interface 128.

In an embodiment of the present invention, a VoIP service subscriber operates the computing device 120. However, the present invention is not so limited. In another embodiment of the present invention, a third party trusted by the VoIP service provider operates the computing device 120.

Referring to FIG. 1, when processor 126 detects the presence of VSAM 100 at I/O interface 122, the softphone client instructions prompts the user of VSAM 100 for identifying information. The identifying information is sent to VoIP service gateway 140 for authentication. If the user of VSAM 100 provides the correct identifying information, the softphone client instructions 102 provide information to VoIP service provider gateway 140 that identifies the network location of the computing device 120 on which the softphone client instructions are located, thereby permitting the VoIP service subscriber to send telephone calls to, and receive telephone calls from, VoIP clients and PSTN clients.

Referring again to FIG. 2, VoIP service provider gateway 140 associates the VoIP service subscriber identifying information and the network location information with a subscriber record (e.g., record A 210) in accounting datastore 205. Optionally, usage accountant further comprises instructions to permit the VSAM 100 to obtain current usage data from the accounting datastore 205 for display to the subscriber.

Accounting datastore 205 comprises a record A 210 and a record B 215. While only two records are illustrated, the present invention is not so limited. It is anticipated that accounting datastore 205 will store a large number of records potentially numbering in the millions. Record A 210 comprises an account identifier 212 associated with the VoIP service subscriber using the VSAM and a softphone usage log 216. At a minimum, softphone usage log 216 comprises the number of softphone usage credits currently available to the account identifier 212 associated with the current VoIP service subscriber using VSAM 100.

Optionally, the user of VSAM 100 is further prompted for an activation code. A user without an activation code declines the prompt and the softphone client instructions 102 are loaded as previously described. A user with an activation code enters the activation code, and the code is reported to VoIP service gateway 140. The activation code is reported to an accounting server 200 and is used to associate pre-paid softphone usage credits with the user of VSAM 100.

Figure 3B:
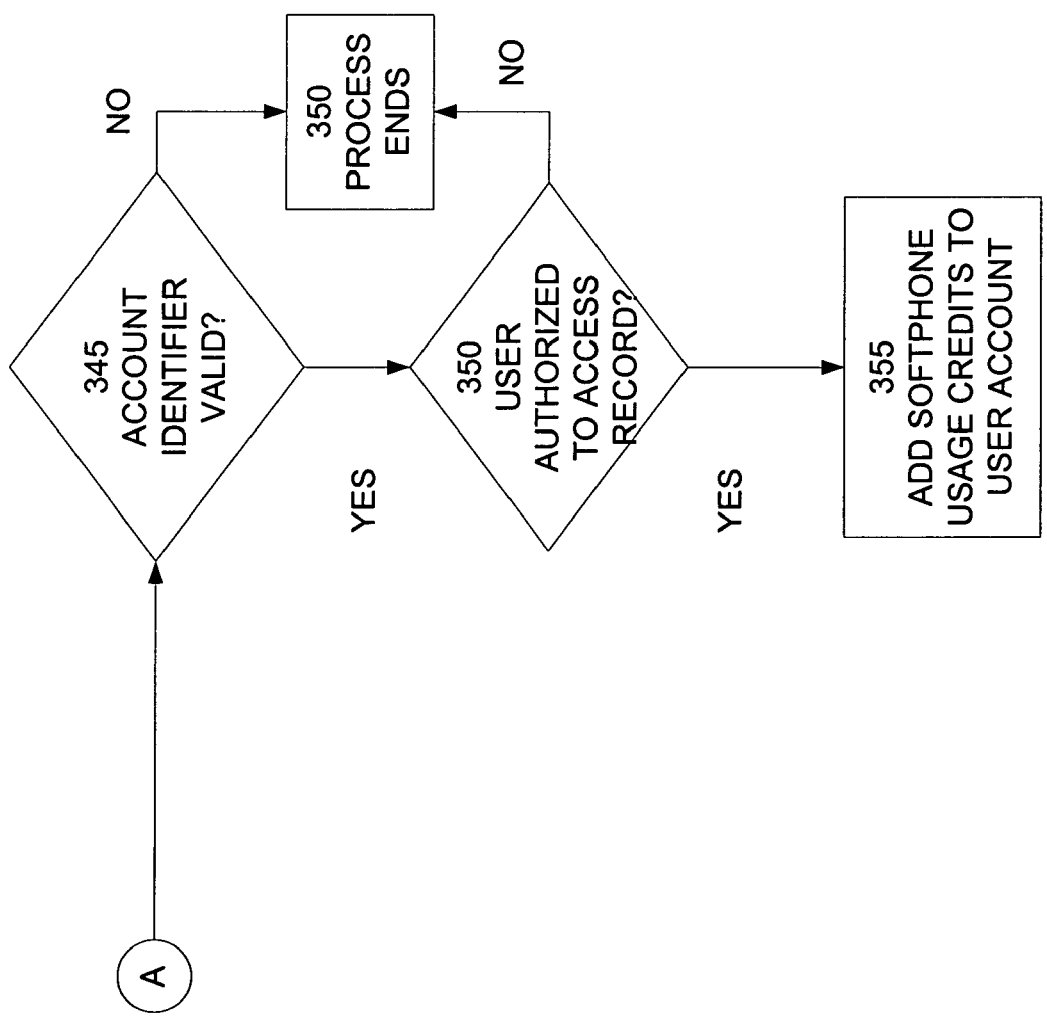

FIGS. 3A and 3B illustrate the flow of a process in which a VSAM acquires softphone usage credits according to embodiments of the present invention. Referring to FIG. 3A, a computing device connects to a VSAM 300. Softphone client instructions are loaded into the volatile memory of the computing device 305. The computing device displays a prompt for user identifying information 310. A determination is made whether the information provided matches the identifying information stored at the service provider gateway 312. If the identifying information does not match the information stored on the service provider gateway, the process ends and usage of the softphone is denied 320. If the supplied identifying information matches that held by the server provider gateway, the user of the VSAM is further prompted for an activation code 314. A user without an activation code declines the prompt and the user is offered an opportunity to add softphone usage credits 325. A user with an activation code enters the activation code and the code is reported to an accounting server 316. The activation code is used to associate pre-paid softphone usage credits with the user 318. The user is then offered an opportunity to add additional softphone usage credits 325.

A user without an activation code declines the prompt and the user is offered opportunity to add softphone usage credits 325. If the user declines, the add-credit process ends 330. If the user accepts, the service provider gateway receives a user account identifier 340.

In an embodiment of the present invention, the account identifier is provided from the user of the computing device in response to prompt from the accounting server. In this embodiment, the accounting server associates the rights of the user with the account identifier provided in response to the prompt. The accounting server uses the account identifier to determine the records (210 and 215 in FIG. 2) that the user of the computing device may access and modify. This embodiment is particularly useful to a retailer that offers additional softphone usage credits to subscribers of VoIP services provided by a VoIP service provider. Additionally, the VoIP service provider may reserve account identifiers for a particular retailer so as to create an exclusive customer relationship between the retailer and a purchaser of a VSAM. In yet another embodiment of the present invention, the account identifiers are reserved for members of an organization and made accessible only to an authorized individual within that organization.

In an alternate embodiment, access to the accounting datastore is limited to the record associated with the account identifier as determined during the verification of the user identifying information. The account identifier is provided to the accounting server by the service provider gateway. This embodiment provides a subscriber limited access to the accounting database to purchase additional softphone usage credits.

Referring to FIG. 3B, a determination is made whether the account identifier matches the account identifier stored on the accounting server 345. If the account identifier does not match the account identifier stored on the accounting server, the add-credits process ends 350. If the supplied account identifier matches that held by the accounting server but the account identifier is associated with a record that the user is not authorized to access, the process ends 350. If the supplied account identifier matches that held by the accounting server and the account identifier is associated with a record that the user is authorized to access, the accounting server initiates a transaction by which the user may acquire additional softphone usage credits for the account identified by the account identifier 355.

In an alternate embodiment of the present invention, the PMD comprises a CD ROM. The softphone client is installed in its own closed session. The softphone client is adapted to autorun from the CD ROM when the CD is inserted in an appropriate reader and to load an instance of the softphone client in the volatile memory of the computing device.

Figure 4:
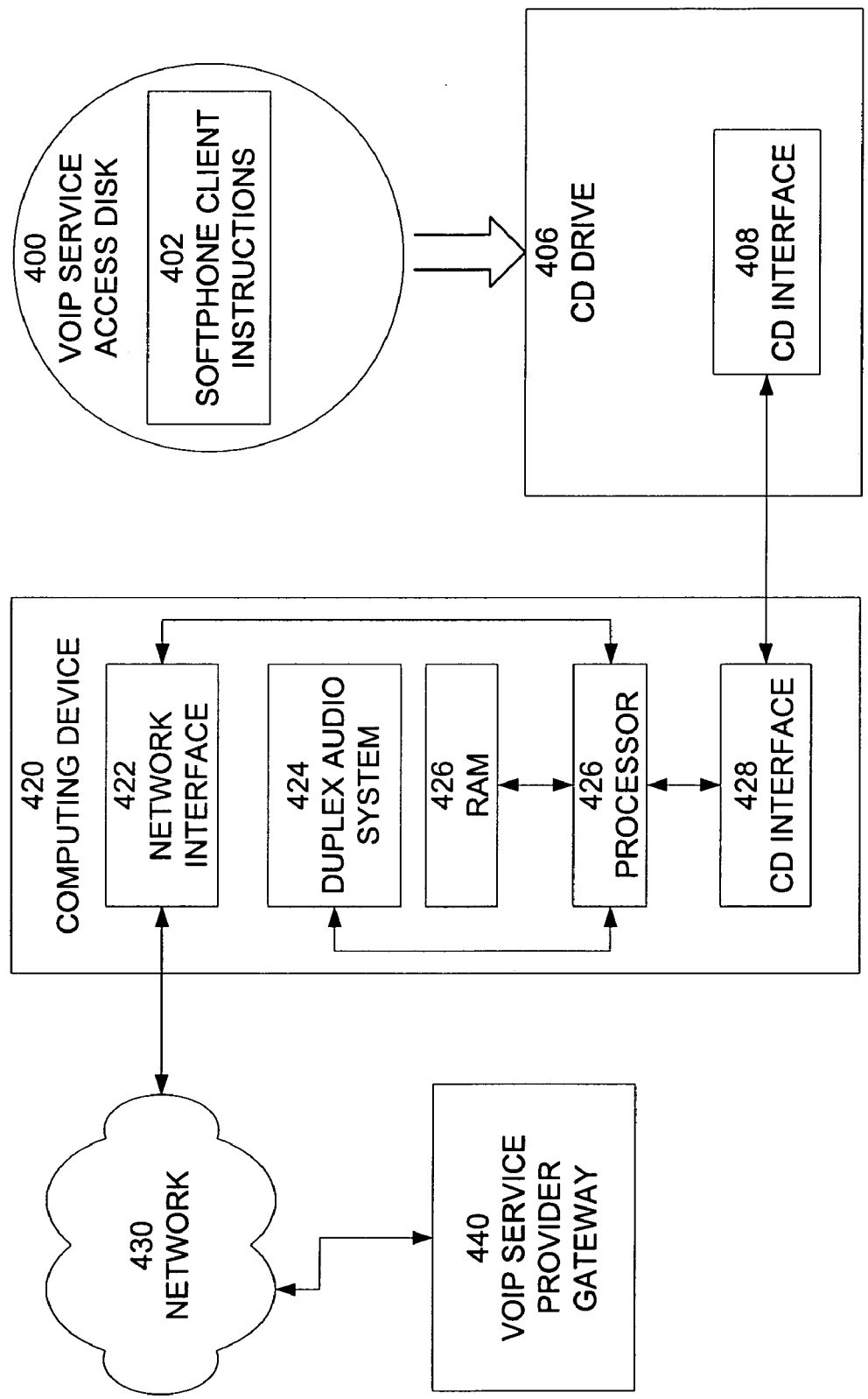
FIG. 4 illustrates a block diagram of the components of a VoIP service access disk (VSAD) according to embodiments of the present invention.

FIG. 4 illustrates a block diagram of the components of a VoIP service access disk (VSAD) according to embodiments of the present invention. Referring to FIG. 4, CD drive 406 connects to a computing device 420 via compatible CD interfaces 408 and 428. In an embodiment of the present invention, computing device 420 is a desktop computer. However, as will be appreciated by those skilled in the art, this is not meant as a limitation. Other computing devices may be used without departing from the scope of the present invention. By way of illustration, computing device 420 may be a laptop computer or a personal data assistant (PDA) having a duplex audio system.

In an embodiment of the present invention, CD interfaces are Intelligent Drive Electronics (IDE; also referred to as Integrated Drive Electronic) interfaces. In another embodiment of the present invention, CD interfaces 408 and 428 are USB ports. As will be appreciated by those skilled in the art, other interfaces may be used to connect CD drive 406 and computing device 420 so long as the interfaces are compatible.

VoIP service access disk (VSAD) 400 comprises softphone client instructions 402. Softphone client instructions 402 comprise code executable by the operating system of computing device 420. The softphone client instructions 402 enable computing device 420 to perform the functions of a plain old telephone including dialing, sending voice information, and receiving voice communications.

In an embodiment of the present invention, the softphone client instructions 402 are adapted to auto-run upon detection of the installation of VSAD 400.

In yet another embodiment of the present invention, VSAD 400 further comprises read/write media and CD drive 406 is adapted to both read from and write to this media. In this embodiment of the present invention, VSAD 400 comprises a multi-session CD. The softphone client instructions 102 are written to a closed session. A writable portion of VSAD 400 comprises an open session. In this embodiment, the writable portion of the CD comprises a telephone directory file and user preference information file. When the softphone client is loaded, the softphone client instructions 402 locates the files and loads the directory and user preference information into the volatile memory of the computing device. In yet another embodiment of the present invention, softphone client instructions 402 comprise a conversation recording/playback feature for recording a telephone conversation and storing the recording as a file in the read/write memory 406 for later playback by the user.

Computing device 420 further comprises processor 426, which controls communications over CD interfaces 428 and 408, the loading of softphone client instructions 402 in random access memory 426, and the execution of those instructions. In an embodiment of the present invention, processor 426 detects the presence of VSAD 400 at CD interface 428, loads softphone client instructions 402 into RAM 426, and executes those instructions.

When processor 426 detects the presence of VSAD 400 at CD interface 428, the softphone client instructions prompts the user of VSAD 400 for identifying information. The identifying information is sent to VoIP service gateway 440 for authentication. If the user of VSAD 400 provides the correct identifying information, processor 426 then continues to loads softphone client instructions 402 as previously described. Additionally, the softphone client instructions 402 provide information to VoIP service provider gateway 440 that identifies the network location of the computing device 420 on which the softphone client instructions are located, thereby facilitating telephone calls to and from the VSAM 400. In still another embodiment of the present invention, processor 426 continues to monitor the presence of service access module 400. If VSAD 400 is removed, the softphone client instructions are unloaded from RAM 426.

Optionally, the user of VSAM 400 is further prompted for an activation code. A user without an activation code declines the prompt and the softphone client instructions 402 are loaded as previously described. A user with an activation code enters the activation code, and the code is reported to VoIP service gateway 440. The activation code is reported to an accounting server 200 (see FIG. 2) and is used to associate pre-paid softphone usage credits with the user of VSAM 400.

Computing device 420 further comprises network interface 422 that permits computing device 420 to send and receive VoIP packets to VoIP service provider gateway 440 via network 430. In an embodiment of the present invention, network 430 is the Internet, however this is not meant as a limitation. Network 430 may be any IP network through which computing device 420 may communicate with VoIP service provider gateway 440. By way of illustration, and not as a limitation, network 430 is a cable network. In this embodiment, network interface 422 connects to network 430 through a cable modem (not illustrated but known to those skilled in the art).

Network interface 422 may be a wired interface or a wireless interface. Where network interface 422 is a wireless interface, network 430 is a wireless network that can communicate with the network on which VoIP service provider gateway 440 is located.

A portable VoIP service access module has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A portable telephony device, comprising:
   a portable memory device having a universal serial bus ('USB) interface to facilitate communication with a computing device when the USB interface is coupled to the computing device; and
   instructions stored on the portable memory device, wherein the instructions are executable by the computing device to automatically run softphone software at the computing device when the portable memory device is coupled to the computing device, wherein the softphone software stops running at the computing device when the portable memory device is uncoupled from the computing device, and wherein the softphone software is executable to:
   send and receive voice communications via a Voice over Internet Protocol (VoIP);
   store a telephone directory file on the portable memory device;
   store user preference information on the portable memory device; and
   send data to a service provider gateway, wherein the data associates the portable telephony device with a service provider account record.

2. The portable telephony device of claim 1, wherein the softphone software is executable to load the telephone directory file to the computing device automatically.

3. The portable telephony device of claim 1, wherein the softphone software is executable to load the user preference information to the computing device.

4. The portable telephony device of claim 1, wherein automatically running the softphone software comprises loading an instance of the softphone software into volatile memory of the computing device.

5. The portable telephony device of claim 4, wherein stopping running of the softphone software comprises removing the instance of the softphone software from the volatile memory.

6. The portable telephony device of claim 1, wherein the computing device comprises a duplex audio system.

7. The portable telephony device of claim 1, wherein the softphone software is executable to maintain a call log.

8. The portable telephony device of claim 1, wherein the portable memory device comprises a read-only memory portion and a read/write memory portion.

9. The portable telephony device of claim 1, wherein the service provider account record is associated with service credits.

10. A method comprising:
    loading an instance of a softphone client from a portable memory device to a computing system automatically when the portable memory device is coupled to the computing system;
    sending data to a service provider device to associate the instance of the softphone client with a user account record; and
    sending and receiving data related to voice communications via the service provider device using a Voice over Internet Protocol (VoIP).

11. The method of claim 10, wherein the computing system is selected from the group consisting of a desktop computer, a laptop computer, and a personal data assistant.

12. The method of claim 10, further comprising reading or writing a telephone directory file at the portable memory device.

13. The method of claim 10, further comprising reading or writing a user preference file at the portable memory device.

14. The method of claim 10, further comprising writing data to a call log file.

15. The method of claim 10, wherein the user account record is associated with usage credits.

16. The method of claim 10, wherein the voice communications terminate at a public switch telephone network device.

17. A method comprising:
receiving data from an instance of a softphone client via a computing system, wherein the softphone client is stored at a portable memory device and wherein the instance of the softphone client is automatically loaded to the computing system when the portable memory device is coupled to the computing system;
associating the instance of the softphone client with a user account record based on the received data; and
tracking usage credits associated with the user account record, wherein the usage credits are related to voice communications sent via the instance of the softphone client.

18. The method of claim 17, further comprising permitting voice communications via a service provider gateway based on the received data.

19. The method of claim 17, further comprising authenticating a user of the instance of the softphone client based on identifying information sent from the computing system.

20. The method of claim 17, further comprising receiving identification information via the instance of the softphone client, and determining whether the identification information matches information associated with the user account record.

21. The method of claim 20, further comprising sending a prompt to the computing system.

22. The method of claim 20, further comprising not permitting voice communications from the instance of the softphone client via a service provider gateway when the identification information does not match information associated with the user account record.

23. The method of claim 20, further comprising permitting voice communications from the instance of the softphone client via a service provider gateway when the identification information matches information associated with the user account record.

24. The method of claim 17, wherein the received data includes network location information related to the computing device.

25. The method of claim 17, wherein the received data includes an activation code.

26. A voice over internet protocol service access module (VSAM) comprising:
a portable memory device, wherein the portable memory device is adapted to operate when installed in a computing device comprising a duplex audio system;
a softphone client stored on the portable memory device, the softphone client comprising instructions for:
auto-running the softphone client upon detection of the portable memory device by the computing device; and
performing the functions of a plain old telephone; and
a read/write memory to store a user file maintained by the softphone client, wherein the user profile associates the softphone client with a user account at a service provider device.

27. The VSAM of claim 26, wherein the computing device is selected from the group consisting of a desktop computer, a laptop computer, and a personal data assistant.

28. The VSAM of claim 26, wherein the user file maintained by the softphone client in the read/write memory includes a telephone directory file.

29. The VSAM of claim 26, wherein the user file maintained byte softphone client in the read/write memory includes a user preference file.

30. The VSAM of claim 26, wherein the user file maintained by the softphone client in the read/write memory comprises a telephone conversation recording.

* * * * *

UNITED STATES PATENT AND TRADEMARK OFFICE
CERTIFICATE OF CORRECTION

PATENT NO. : 7,336,654 B2  Page 1 of 1
APPLICATION NO. : 10/972726
DATED : February 26, 2008
INVENTOR(S) : Robb Barkley, Mark Baker and Douglas F. Bender It is certified that error appears in the above-identified patent and that said Letters Patent is hereby corrected as shown below:

In the Claims section, column 12, line 29, "byte" should be changed to --by the--.

Signed and Sealed this

Third Day of June, 2008

JON W. DUDAS
*Director of the United States Patent and Trademark Office*

(12) EX PARTE REEXAMINATION CERTIFICATE (8931st)
United States Patent
Barkley et al.

(10) Number: US 7,336,654 C1
(45) Certificate Issued: Mar. 27, 2012

(54) PORTABLE VOIP SERVICE ACCESS MODULE

(75) Inventors: Robb Barkley, Marietta, GA (US);
Mark Baker, Alpharetta, GA (US);
Douglas F. Bender, Scotts Valley, CA (US)

(73) Assignee: Personal Voice Freedom, LLC, Wilmington, DE (US)

Reexamination Request:
No. 90/011,881, Aug. 29, 2011

Reexamination Certificate for:
Patent No.: 7,336,654
Issued: Feb. 26, 2008
Appl. No.: 10/972,726
Filed: Oct. 25, 2004

Certificate of Correction issued Jun. 3, 2008.

Related U.S. Application Data

(63) Continuation-in-part of application No. 10/969,516, filed on Oct. 20, 2004, now abandoned.

(51) Int. Cl.
*H04L 12/66* (2006.01)
*H04L 12/56* (2006.01)
*H04L 12/28* (2006.01)

(52) U.S. Cl. ........................................ 370/350; 370/338
(58) Field of Classification Search ........................ None
See application file for complete search history.

(56) References Cited

To view the complete listing of prior art documents cited during the proceeding for Reexamination Control Number 90/011,881, please refer to the USPTO's public Patent Application Information Retrieval (PAIR) system under the Display References tab.

*Primary Examiner* — Salman Ahmed

(57) ABSTRACT

A voice over IP (VoIP) softphone access module (VSAM) comprises a softphone client installed on a portable memory device (PMD). The softphone client is installed in its own read-only partition. The softphone client is adapted to auto-run from the PMD when the PMD is connected to a computing device and to load an instance of the softphone client in the volatile memory of the computing device. When used with a computing device comprising a duplex audio system with analog-to-digital conversion and an Internet connection, the VSAM permits a VoIP service subscriber to send and receive VoIP telephone calls through a VoIP service provider gateway. The VSAM may be associated with an activation code that when sent to the VoIP service provider gateway associates a user with pre-paid softphone usage credits. Alternatively, the softphone client is installed on CD.

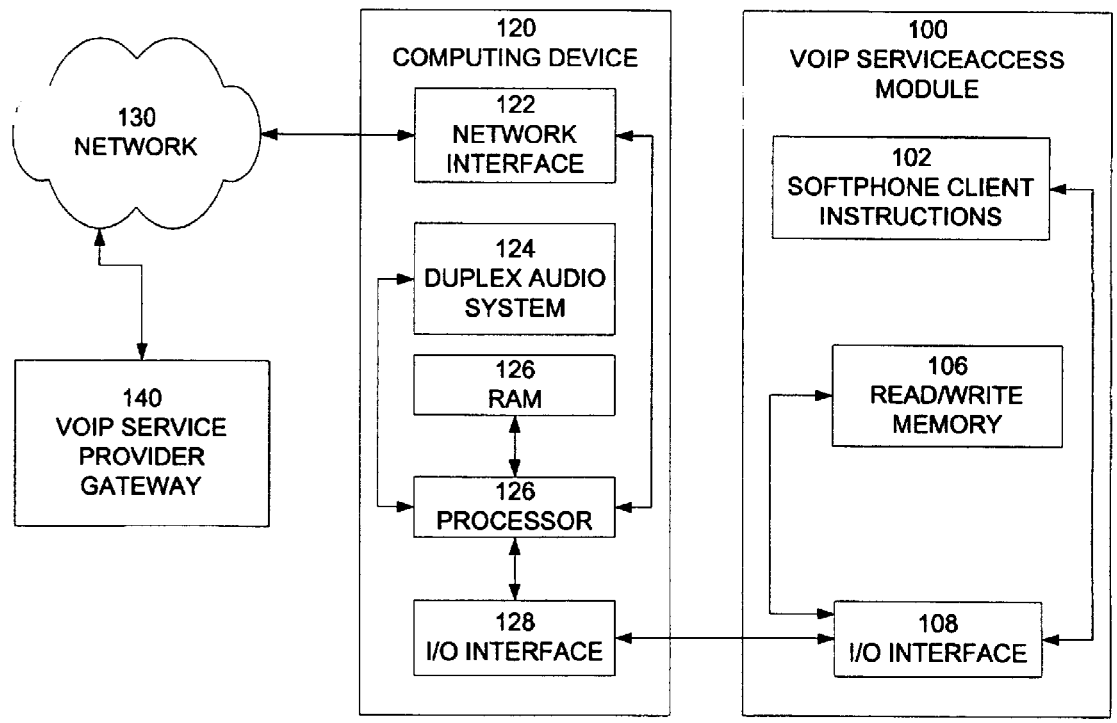

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 10, 17-20, 22, 23 and 26 are determined to be patentable as amended.

Claims 2-9, 11-16, 21, 24, 25 and 27-30 dependent on an amended claim, are determined to be patentable.

1. A portable telephony device, comprising:
    a portable memory device having a universal serial bus ([']USB) interface to facilitate communication with a computing device when the USB interface is coupled to the computing device; and
    instructions stored on the portable memory device, wherein the instructions are executable by the computing device to automatically run softphone software at the computing device when the portable memory device is coupled to the computing device, wherein the softphone software stops running at the computing device when the portable memory device is uncoupled from the computing device, and wherein the softphone software is executable to:
    provide a user interface;
    interface with audio hardware;
    communicate with a service provider gateway device over a network;
    initiate, send,[and]receive, *and terminate* voice communications via a Voice over Internet Protocol (VoIP);
    store a telephone directory file on the portable memory device;
    store user preference information on the portable memory device; [and send data to a]
    communicate with *the* service provider gateway *device*, [wherein the data associates] *to associate the softphone software with* the portable telephony device with a service provider account record *and to provide the service provider gateway device information that identifies a network location of the softphone client; and*
    *facilitate sending and receiving of the voice communications via the service provider gateway device using the VoIP to a VoIP service subscriber or to a public switched network telephone subscriber.*

10. A method *of communicating via a Voice over Internet Protocol (VoIP),* the method over a network comprising:
    loading [an instance of] a softphone client from a portable memory device to a computing system automatically when the portable memory device is coupled to the computing system, *the softphone client being capable of:*
    *providing a user interface,*
    *initiating, sending, receiving, and terminating voice communications, and*
    *interfacing with audio hardware;* [sending data to]
    causing the softphone client to be executed at the computing system;
    communicating with a service provider *gateway* device to associate [the instance of] the softphone client with a user account record *and to provide the service provider gateway device information that identifies a network location of the softphone client;* [and]
    communicating with the service provider gateway device to initiate and receive voice communications over the network;
    *facilitating* sending and receiving [data related to] *of* voice communications via the service provider *gateway* device using [a Voice over Internet Protocol (] the VoIP[)] *to a VoIP service subscriber or to a public switched network telephone subscriber; and*
    *automatically terminating the voice communications via the service provider gateway device when the portable memory device is uncoupled from the computing device.*

17. A method *of communicating via a Voice over Internet Protocol (VoIP) over a network, the method* comprising:
    receiving data from [an instance of] a softphone client via a computing system, wherein the softphone client is stored at a portable memory device and wherein [the instance of] the softphone client is automatically loaded to *and executed at* the computing system when the portable memory device is coupled to the computing system, *the softphone client being capable of:*
    *providing a user interface,*
    *initiating, sending, receiving, and terminating voice communications, and*
    *interfacing with audio hardware;*
    associating [the instance of] the softphone client with a user account record based on the received data [and] *and identifying a network location of the softphone client;*
    communicating with the softphone client to initiate and receive voice communications over the network;
    *facilitating* sending and receiving *of the* voice communications via the softphone client using *the* VoIP *to a VoIP service subscriber or to a public switched network telephone subscriber;*
    *automatically terminating the voice communications when the portable memory device is uncoupled from the computing device; and*
    tracking usage credits associated with user account record, wherein the usage credits are related to *the* voice communications sent via [the instance of] the softphone client.

18. The method of claim 17, further comprising permitting voice communications via a service provider gateway *device* based on the received data.

19. The method of claim 17, further comprising authenticating [a user of the instance of] the softphone client based on identifying information sent from the computing system.

20. The method of claim 17, further comprising receiving identification information via [the instance of] the softphone client, and determing whether the identification information matches information associated with the user account record.

22. The method of claim 20, further comprising not permitting voice communications from [the instance of] the softphone client via a service provider gateway when the identification information does not match information associated with the user account record.

23. The method of claim 20, further comprising permitting voice communications from [the instance of] the softphone client via a service provider gateway when the identification information matches information associated with the user account record.

26. A voice over internet protocol (*VoIP*) service access module (VSAM) comprising:
 a portable memory device, wherein the portable memory device is adapted to operate when installed in computing device comprising a duplex audio system;
 a softphone client stored on the portable memory device, the softphone client comprising instructions for:
  *providing a user interface;*
  *interfacing with audio hardware;*
  *communicating with a service provider gateway device over a network;*
  *initiating, sending, receiving, and terminating voice communications;*
  auto-running the softphone client upon detection of the portable memory device by the computing device; [and]
  performing the functions of a plain old telephone;
  *communicating with the service provider gateway device to associate the softphone client with a user account record and to provide the service provider gateway device information that identifies a network location of the softphone client;*
  *facilitating sending and receiving of the voice communications via the service provider gateway device using the VoIP to a VoIP service subscriber or to a public switched network telephone subscriber; and*
  *automatically terminating the voice communications via the service provider gateway device when the portable memory device is uncoupled from the computing device;* and
 a read/write memory to store a user file maintained by the softphone client, wherein the user profile associates the softphone client with [a] *the* user account at [a] *the* service provider *gateway* device.

\* \* \* \* \*